(12) United States Patent
Yano (10) Patent No.: US 10,180,010 B2
(45) Date of Patent: Jan. 15, 2019

(54) HALF-UNDERGROUND EVACUATION SHELTER

(71) Applicant: SHELTER JAPAN Co., Ltd., Hamamatsu-shi, Shizuoka (JP)

(72) Inventor: Akihiko Yano, Toyohashi (JP)

(73) Assignee: SHELTER JAPAN CO., LTD., Shizuoka (JP)

(*) Notice: Subject to any disclaimer, the term of this patent is extended or adjusted under 35 U.S.C. 154(b) by 0 days.

(21) Appl. No.: 15/578,811

(22) PCT Filed: Jun. 1, 2016

(86) PCT No.: PCT/JP2016/002629
§ 371 (c)(1),
(2) Date: Dec. 1, 2017

(87) PCT Pub. No.: WO2016/194367
PCT Pub. Date: Dec. 8, 2016

(65) Prior Publication Data
US 2018/0148948 A1 May 31, 2018

(30) Foreign Application Priority Data
Jun. 2, 2015 (JP) .................................. 2015-112350

(51) Int. Cl.
*E04H 9/14* (2006.01)
*E04H 9/16* (2006.01)
*E04H 9/02* (2006.01)

(52) U.S. Cl.
CPC ............... *E04H 9/14* (2013.01); *E04H 9/028* (2013.01); *E04H 9/16* (2013.01); *E04H 9/024* (2013.01); *E04H 2009/026* (2013.01)

(58) Field of Classification Search
CPC .... E04H 9/00; E04H 9/02; E04H 9/14; E04H 9/16; E04H 9/10; E04H 9/12; E04H 9/028
See application file for complete search history.

(56) References Cited

U.S. PATENT DOCUMENTS 744,199 A * 11/1903 Hubbell .................... E04H 9/12
52/169.6
2,936,504 A * 5/1960 Le Roy Harris ......... E04H 9/10
109/1 S (Continued)

FOREIGN PATENT DOCUMENTS

| JP | 1-169085 A | 7/1989 |
|---|---|---|
| JP | 3178495 U | 8/2012 |

(Continued)

OTHER PUBLICATIONS

International Search Report from International Application No. PCT/US2016/002629 dated Aug. 23, 2016.

*Primary Examiner* — Adriana Figueroa
*Assistant Examiner* — Jessie T Fonseca
(74) *Attorney, Agent, or Firm* — Brundidge & Stanger, P.C.

(57) ABSTRACT

The purpose of the present invention is to reduce costs and building time, address the safety of shelter main body against a tsunami, ensure water pressure resistance against a tsunami caused by a Nankai Trough Great Earthquake, provide the safety required when using an evacuation shelter, provide favorable livability, and shorten evacuation time. A shelter main body 3 is a structure made of reinforced concrete; slopes 3a are provided to two sides of the exterior of the shelter main body 3. Surplus soil is provided to the slopes 3a, the surface is covered with concrete, the shelter main body 3 is reinforced with a plurality of H-section steel members 3b, an opening 4 is provided to an above-ground (Continued)

part, and an outside door 5 and inside door 6, which constitute a double structure fireproof steel door for opening and closing the opening 4, are provided, thus forming a structure for withstanding tsunami pressures.

4 Claims, 11 Drawing Sheets

(56) References Cited

U.S. PATENT DOCUMENTS

| | | | | | |
|---|---|---|---|---|---|
| 3,012,300 | A | * | 12/1961 | Le Roy Harris | E04G 11/02 249/14 |
| 3,038,565 | A | * | 6/1962 | Bruce | E04H 9/12 109/1 S |
| 3,049,835 | A | * | 8/1962 | Sundstrum | E04H 9/12 109/1 S |
| 3,138,124 | A | * | 6/1964 | Baier | E04H 9/12 109/1 S |
| 3,159,117 | A | * | 12/1964 | Rosenfeld | E04H 9/12 109/1 S |
| 3,164,111 | A | * | 1/1965 | Lanni | E04H 9/12 109/1 S |
| 3,212,220 | A | * | 10/1965 | Boniecki | E04H 9/10 109/1 S |
| 3,242,845 | A | * | 3/1966 | Thomas | E04H 9/00 220/23.83 |
| 4,352,260 | A | * | 10/1982 | Pearcey | E04B 1/3211 52/169.6 |
| 4,507,899 | A | * | 4/1985 | Janitzky | E04H 9/12 52/169.6 |
| 4,642,952 | A | * | 2/1987 | Prandin | E04H 9/12 109/1 S |
| 4,660,334 | A | * | 4/1987 | McCarthy | E04H 9/12 109/1 S |
| 4,805,360 | A | * | 2/1989 | Kuehnl | E04H 9/12 52/169.1 |
| 4,955,166 | A | * | 9/1990 | Qualline | E04H 9/12 52/169.6 |
| 5,115,613 | A | * | 5/1992 | McCarthy | E04H 9/12 109/1 S |
| 5,953,866 | A | * | 9/1999 | Poole | E04H 9/14 52/169.6 |
| 6,131,343 | A | * | 10/2000 | Jackson, Jr. | E04H 9/12 52/86 |
| 6,434,896 | B1 | * | 8/2002 | Mitchell | B29C 41/06 52/169.6 |
| 6,438,907 | B1 | * | 8/2002 | McCarthy | E04H 9/12 52/169.1 |
| 7,428,800 | B1 | * | 9/2008 | Vaughn | E04H 9/12 52/169.9 |
| 8,661,746 | B1 | * | 3/2014 | Kouba | E02D 27/00 109/1 S |
| 8,925,261 | B1 | * | 1/2015 | Kouba | E02D 27/00 109/1 S |
| 2002/0046515 | A1 | * | 4/2002 | McCarthy | E04H 9/12 52/169.6 |
| 2002/0124490 | A1 | * | 9/2002 | McCarthy | E04H 9/12 52/169.6 |
| 2003/0167708 | A1 | * | 9/2003 | Shaw | E04H 9/08 52/169.6 |
| 2007/0022678 | A1 | * | 2/2007 | Sempel | E04H 9/08 52/169.6 |
| 2011/0094166 | A1 | * | 4/2011 | Lavi | E04H 9/04 52/79.1 |
| 2013/0125478 | A1 | * | 5/2013 | Trochan | E04H 9/14 52/80.1 |
| 2015/0068466 | A1 | * | 3/2015 | Piccioni | E04B 1/34363 119/448 |
| 2017/0275907 | A1 | * | 9/2017 | Brooks | E02D 29/045 |

FOREIGN PATENT DOCUMENTS

| | | |
|---|---|---|
| JP | 2012-233385 A | 11/2012 |
| JP | 2013-160037 A | 8/2013 |
| JP | 2014-80847 A | 5/2014 |
| JP | 2015-92049 A | 5/2015 |
| JP | 2015092049 A * | 5/2015 |

* cited by examiner

Calculation of designed soil bearing capacity
i) vertical load assumed value N = 10 basic shape: 1.80 × 8.43

$i_c = i_q = (1 - 0 / 90°)^2 = 1.00$
$\alpha = 1.0 + 0.2 \times \frac{1.6}{6.4} = 1.05$
$c = 0 \text{ kN/m}^2$
$\phi = \sqrt{20 \times 10} + 15 = 29.14° = 0.509 \text{ rad}$ $N_q = \frac{1 + \sin\phi}{1 - \sin\phi} \times \exp(\pi \tan\phi) = 16.71$
$N_c = (N_q - 1) \times \cot\phi = 28.17$
$N_\gamma = (N_q - 1) \times \tan(1.4\phi) = 13.56$
$i_\gamma = (1 - 0 / 28.1°)^2 = 1.00$
$\beta = 0.5 - 0.2 \times \frac{1.80}{6.43} = 0.45$ $\gamma_1 = 18 \text{ kN/m}^3 \quad \gamma_2 = 18 \text{ kN/m}^3$
$B = 1.80 \text{ m} \quad \eta = (1.60 / B_0)^{-1/1} = 0.85$
$D_f = 0.00 \text{ m} \quad B_0 = 1.00 \text{ m}$ $_Lq_a = \frac{1}{3}(i_c \cdot \alpha \cdot c \cdot N_c + i_\gamma \cdot \beta \cdot \gamma_1 \cdot B \cdot \eta \cdot N_\gamma + i_q \cdot \gamma_2 \cdot D_f \cdot N_q)$
$= \frac{1}{3}(1 \times 1.05 \times 0 \times 28.17 + 1 \times 18 \times 0.45 \times 18 \times 16.71$
$\times 0.85 + 133.60 + 0) = 44.53 \text{ kN/m}^2$ $_Sq_a = \frac{2}{3}(i_c \cdot \alpha \cdot c \cdot N_c + i_\gamma \cdot \beta \cdot \gamma_1 \cdot B \cdot \eta \cdot N_\gamma + i_q \cdot \gamma_2 \cdot D_f \cdot N_q)$
$= \frac{2}{3}(0 + 133.60 + 0) = 89.07 \text{ kN/m}^2$ $_Lq_a \fallingdotseq 30 \text{ kN/m}^2$ ii) Tsunami load (assuming a submergence by a tsunami)

N value = 10 basic shape: 1.80 × 8.43

$i_c = i_q = (1 - 0 / 90°)^2 = 1.00$
$\alpha = 1.0 + 0.2 \times \frac{1.6}{6.4} = 1.05$
$c = 0 \text{ kN/m}^2$
$\phi = \sqrt{20 \times 10} + 15 = 29.14° = 0.509 \text{ rad}$ $N_q = \frac{1 + \sin\phi}{1 - \sin\phi} \times \exp(\pi \tan\phi) = 16.71$
$N_c = (N_q - 1) \times \cot\phi = 28.17$
$N_\gamma = (N_q - 1) \times \tan(1.4\phi) = 13.56$
$i_\gamma = (1 - 0 / 28.1°)^2 = 1.00$
$\beta = 0.5 - 0.2 \times \frac{1.80}{6.43} = 0.45$ $\gamma_1 = 8 \text{ kN/m}^3 \quad \gamma_2 = 8 \text{ kN/m}^3$
$B = 1.80 \text{ m} \quad \eta = (1.80 / B_0)^{-1/3} = 0.85$
$D_f = 0.00 \text{ m} \quad B_0 = 1.00 \text{ m}$ $_Lq_a = \frac{1}{3}(i_c \cdot \alpha \cdot c \cdot N_c + i_\gamma \cdot \beta \cdot \gamma_1 \cdot B \cdot \eta \cdot N_\gamma + i_q \cdot \gamma_2 \cdot D_f \cdot N_q)$
$= \frac{1}{3}(1 \times 1.05 \times 0 \times 28.17 + 1 \times 8 \times 0.45 \times 8 \times 16.71$
$\times 0.85 + 50.10 + 0) = 16.70 \text{ kN/m}^2$ $_Sq_a = \frac{2}{3}(i_c \cdot \alpha \cdot c \cdot N_c + i_\gamma \cdot \beta \cdot \gamma_1 \cdot B \cdot \eta \cdot N_\gamma + i_q \cdot \gamma_2 \cdot D_f \cdot N_q)$
$= \frac{2}{3}(0 + 50.10 + 0) = 33.40 \text{ kN/m}^2$ $_Lq_a \fallingdotseq 15 \text{ kN/m}^2$

FIG. 11

HALF-UNDERGROUND EVACUATION SHELTER

TECHNICAL FIELD

The present invention relates to a half-underground evacuation shelter for evacuation for disaster that can be installed adjacent to an existing building.

BACKGROUND ART

To prepare for the "Nankai Trough Great Earthquake" which is expected to occur soon, we will develop houses with shelters for evacuation as earthquake countermeasures and tsunami countermeasures. According to the Cabinet Office announcement on Aug. 29, 2012, about 6,400 people are expected to die due to tsunami and about 1,800 people are expected to die due to fire in the Nankai Trough Great Earthquake, in Aichi Prefecture. And 95,000 people are expected to die in neighboring Shizuoka prefecture. Compared with the assumption of the Central Disaster Prevention Council in 2003, the number of deaths announced by the Cabinet Office in 2013 has greatly increased by 13 times. Tsunami would kill 230,000 people, accounting for 70% of the total deaths. The awareness of earthquake and tsunami countermeasures has been increasing in recent years.

Various proposals have been made on a method of fixing a shelter to a foundation as shown in Patent references 1 to 4 and the like.

According to the invention of Patent Reference 1, a sliding door 1 that can withstand impulsive water pressure, a viewing window improved from a pressure resistant manhole, and a manhole 2 for auxiliary evacuation are installed on a wall/roof in a reinforced concrete shelter 6.

According to Patent Reference 2, a seismically isolated structure with a low-rise type building body 1 made of precast pre-stressed concrete as a material and having a general shape of reversed ship bottom is proposed. The foundation portion of the building body 1 is structured by digging down the ground, providing a solid foundation 2 made of reinforced concrete, forming a lattice frame 4a partitioning into an appropriate size on the solid foundation 2 via a plurality of seismic isolation devices 3, providing a base slab 4 filled with filling back earth X in a groove 4b partitioned by the frame 4a, and providing the building body 1 on the base slab 4.

According to Patent Reference 3, an underground shelter fixed to a concrete foundation 2 is proposed. The underground shelter has an escape entrance 6 at the top and and an shelter main body 3 made of nonconcrete material selected from a fiber reinforced plastic, carbon fiber, Kepler fiber, polycarbonate concrete, metal or combination thereof at the bottom, and the escape entrance 6 and the shelter main body 3 are connected by an escape hatch 5 and an escape tube 20.

According to Patent Reference 4, by raising the floor 12 of the evacuation room 3 from the ceiling lowermost portion 15 of the entrance 2 of the tsunami shelter main body 3, the seawater surface 13 invading into the interior at the time of the disaster does not enter the evacuation room 3, and the evacuees 16 are saved by discharge 14 of oxygen cylinders or air cylinders. Since the airtightness of the evacuation room 3 is not influenced by the opening and closing of the entrance door 8, there is no need to close the door 8 at the time of evacuation, and the entrance 2 is not blocked at the time of escape. Inventions have been proposed which have a function to withstand a collision 18 such as pressure of a tsunami and rubble washed by the tsunami by tilting the outer wall and providing sufficient self-weight of the tsunami shelter 1 itself and fixation to the ground 5.

CITATION LIST OF PATENT REFERENCE

Patent Reference 1: JP 2013-160037
Patent Reference 2: JU3178495
Patent Reference 3: JP2014-80847
Patent Reference 4: JP2012-233385

SUMMARY OF INVENTION

Technical Problem

However, the following inconveniences are pointed out in the above-mentioned prior art.

(1) If cost and construction period are to be reduced, it would leave a problem in safety. Therefore there are problems that the cost remains high and the construction term remains long, and countermeasures do not spread to ordinary households. The proportion of households below the average income amount (5,496,000 yen) is 61.4%. Many of the people in this income group reside in rental houses and have many concerns about future burden of residential expenses. Many people do not own land and there is a need of land search.

(2) We can respond to the demands of people who are unsatisfied with simple earthquake-resistant structure while having anxiety about earthquake. It is necessary to secure measures for stability of the shelter main body against a tsunami caused by the Nankai Trough Great Earthquake, water pressure resistant performance against the tsunami generated by the Nankai Trough Great Earthquake, safety performance necessary for using the evacuation shelter, and good living comfort. As the awareness of the earthquake rises, the necessity for shelters is increasing even at individual houses. Given the arrival time to evacuation sites, needs should be high in families with elderly people, infants and physical disabilities.

(3) Most of shelters are of large size. For example, if the construction area of a shelter exceeds 10 square meters, it is necessary to submit a confirmation application to the city office, and there is a problem of cost and complicated work.

(4) If you investigate the Great East Japan Earthquake in detail, there is a place where the ground subsided by more than 60 cm, and if you build an underground shelter in such a place, it sinks under the sea, so the underground type is problematic.

(5) Mobile shelters floating by a tsunami and earthquake-resistant shelters against earthquake cannot stay in the place where people evacuate to, and can withstand neither earthquakes nor secondary disasters such as tsunami, fire and debris flow. Elderly people and people with disabilities cannot safely evacuate. It seems that a floating type shelter sways greatly in the muddy stream of the tsunami and does not have a stabilized habitability.

(6) Shelters are installed in certain places such as public institutions and large-sized facilities and there are disadvantageous inconveniencse that you have to move to such a place in case of emergency. For recent natural disasters (earthquakes, tsunamis, debris flows etc.), it is difficult for elderly people, disabled people and infants, etc. to move to a designated evacuation site in a short time. Shelters for urgently escaping from a tsunami are being studied in order to deal with cases where evacuation time cannot be secured before the arrival of the tsunami. Kochi Prefecture has decided to set up a tsunami evacuation shelter in Muroto City in preparation for the occurrence of the Nankai Trough Great Earthquake. The current situation of the evacuation shelter is that they are considering about constructing facilities consisting of tunnels and vertical shafts in cliff areas of settlements in Muroto city. Sometimes it takes more than 10 minutes from home to evacuation site, and it takes further more time for elderly people and disabled people. Also, it is difficult to climb an evacuation tower and the like by themselves. There is also a shelter of the type floating adjacent to the house, but it is expected that it will be difficult to be searched after being washed by a tsunami.

(7) They do not assume the case when people suffered a tsunami on the premise that people should evacuate to a place higher than the height of the tsunami.

(8) Although there are a large number of people to be accommodated, it is doubtful whether all local residents can be evacuated.

Solution to Problem

In view of the above-mentioned problems, the present invention provides a half-underground evacuation shelter comprising a shelter main body fixed to a concrete foundation. Said shelter main body has a double structure having an outside structure of reinforced concrete and an inside cylindrical structure of an iron plate. A slope is provided outside said shelter main body. Said shelter main body is a reinforced concrete structure with an internal space having a cylindrical structure. A fireproof steel door having a double structure is provided on an above-ground part of said shelter main body. Said shelter main body is structured to withstand a pressure of tsunami. And said concrete foundation is connected to a concrete foundation of a house.

It is preferable to divide the internal space into two layers by a floor.

It is preferable that the shelter is capable of withstanding water pressure of 20 m of water depth and has a residential environment set to allow survival for at least 3 days in a sealed state.

It is preferable that the fireproof steel door has a structure opened and closed by a hinge, said fireproof steel door comprises an outer door and an inner door, and said outer door is opened and closed outward, and said inner door is opened and closed inward. It is preferable that the fireproof steel door has a structure opened and closed by a hinge, said fireproof steel door comprises an outer door and an inner door, and said outer door is opened and closed outward, and said inner door has a sliding type structure.

It is preferable that the half-underground evacuation shelter comprises a jack suspended from a ceiling surface of said shelter main body so as to be able to move up and down in said internal space, a rotating tool for raising and lowering said jack, and a receiving metal bracket for receiving said jack when said jack is lowered.

Advantageous Effects of Invention

The present invention has the following effects.

(1) The half-underground evacuation shelter can be built as a set bonded with the housing foundation and the exterior part, and the cost can be reduced. For example, it is possible to reduce the cost so that people in income groups with an annual income of 3 million to 4 million yen can afford a safe house with a shelter at a price comparable to that of a rental house. By adopting a structure integrated with the foundation of the house, it is possible to aim for dissemination by reducing the cost as compared to the cost for constructing a shelter alone. It becomes possible to sell a house with an evacuation shelter in the garden. This is equivalent to the selling price of the residential part of the average spec houses, and housing with added value of an evacuation shelter is expected to be monetized. The land information, housing and shelter are set, and the mortgage repayment amount becomes clear. It is possible to specify the packaged price including a land and a house with a shelter and the monthly mortgage repayment amount. People can visit an exhibition site to see the structural calculation sheets and actual shelters before deciding to buy. Land information can also be considered as one of commercial items for these people, and it becomes possible to sell a set of a house, land information and a shelter. It is an invention that contributes to the national mission and role of protecting as many lives as possible.

(2) By reducing the size of the shelter main body, it is possible to reduce the construction area of the shelter, it is thus possible to omit the confirmation application to the city government, and to reduce the time and labor for building.

(3) The shelter stays in the place where people evacuate to and is capable of withstanding not only earthquakes but also secondary disasters such as tsunami, fire and debris flow. Even elderly and disabled people can safely evacuate. It can provide innovative and more reliable performance with high necessity in modern society.

(4) Since the shelter is adjacent to a private home such as their own home, you can get in and out from the above-ground in an emergency and evacuate immediately. On the other hand, in conventional techniques, shelters are installed in certain places such as public institutions and large-scale facilities, and people must move to such places in case of emergency.

(5) Adjacent to the residence, people can evacuate in a short time. For example, because it is adjacent to their own home, people can evacuate from 1 minute to 3 minutes even in an emergency. Safety increases in families with elderly people, disabled people and young children who are difficult to evacuate to public evacuation sites. By providing the evacuation shelters for these vulnerable people, even elderly people, disabled people and young children can evacuate within 3 minutes from the occurrence of earthquake warning. In the event of submerges, oxygen and other things necessary for life support for 3 days can be secured, and an environment to live safely and securely is thus provided.

(6) The purpose is thus to provide a secure and safe housing that eliminates concerns about tsunami for people who are living in coastal areas, or people who are hoping to live there in the future.

BRIEF DESCRIPTION OF DRAWINGS

FIG. 2 (a) shows a plan view of the half-underground evacuation shelter 1 according to the embodiment of the present invention, and FIG. 2 (b) shows a front view showing an internal structure of the same;

FIG. 3 (a) shows a front view of the half-underground evacuation shelter 1 according to the embodiment of the present invention, FIG. 3 (b) shows a front view of the iron plate of the shelter main body 3, FIG. 3 (c) shows a back view of the half-underground evacuation shelter 1 according to the embodiment of the present invention;

FIG. 10 shows a chart of a calculation of designed soil bearing capacity, and an assumption of flooding due to a tsunami when a tsunami load is applied for the half-underground evacuation shelter 1 according to the embodiment of the present invention.

DESCRIPTION OF EMBODIMENTS

Figure 1:
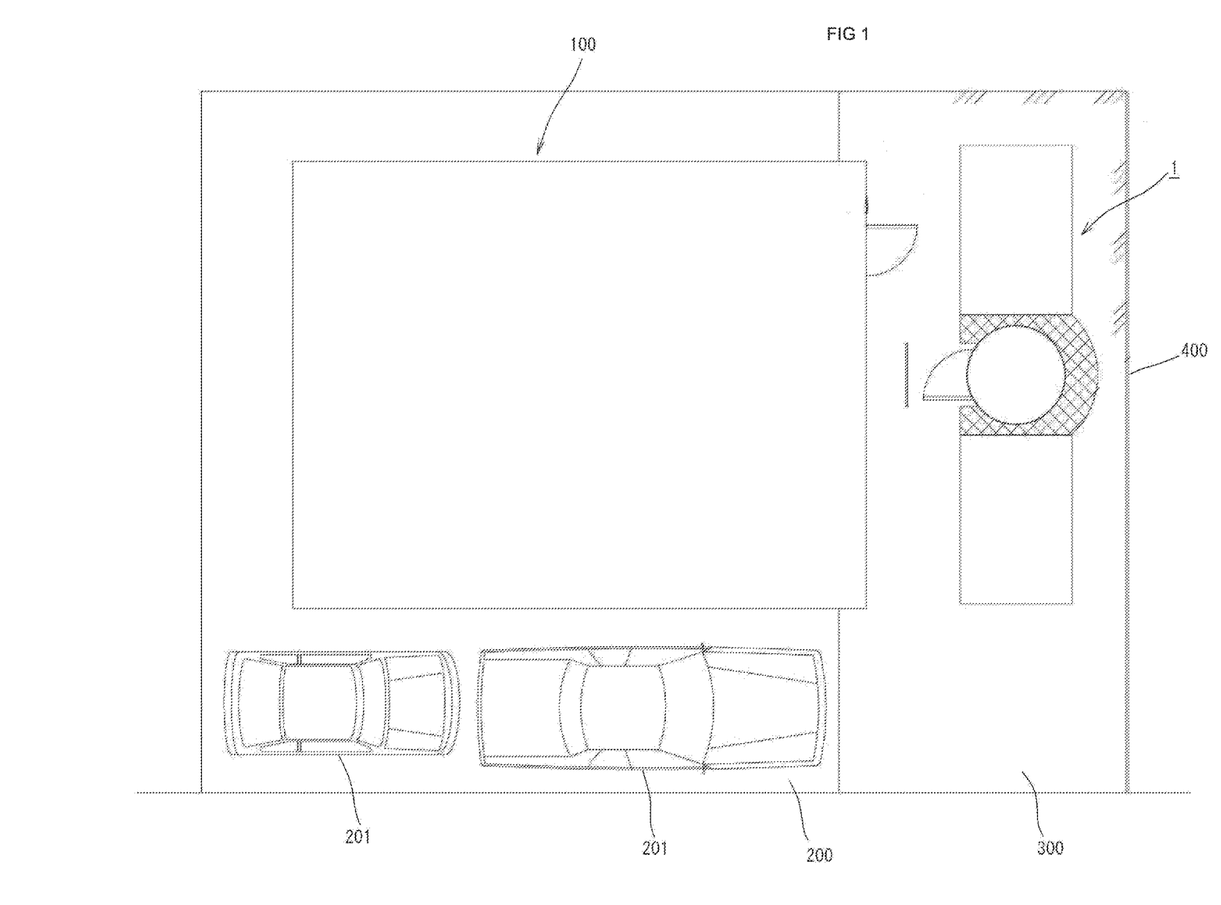
FIG. 1 shows a plan view of a site on which a half-underground evacuation shelter 1 according to an embodiment of the present invention is installed.
Figure 2:
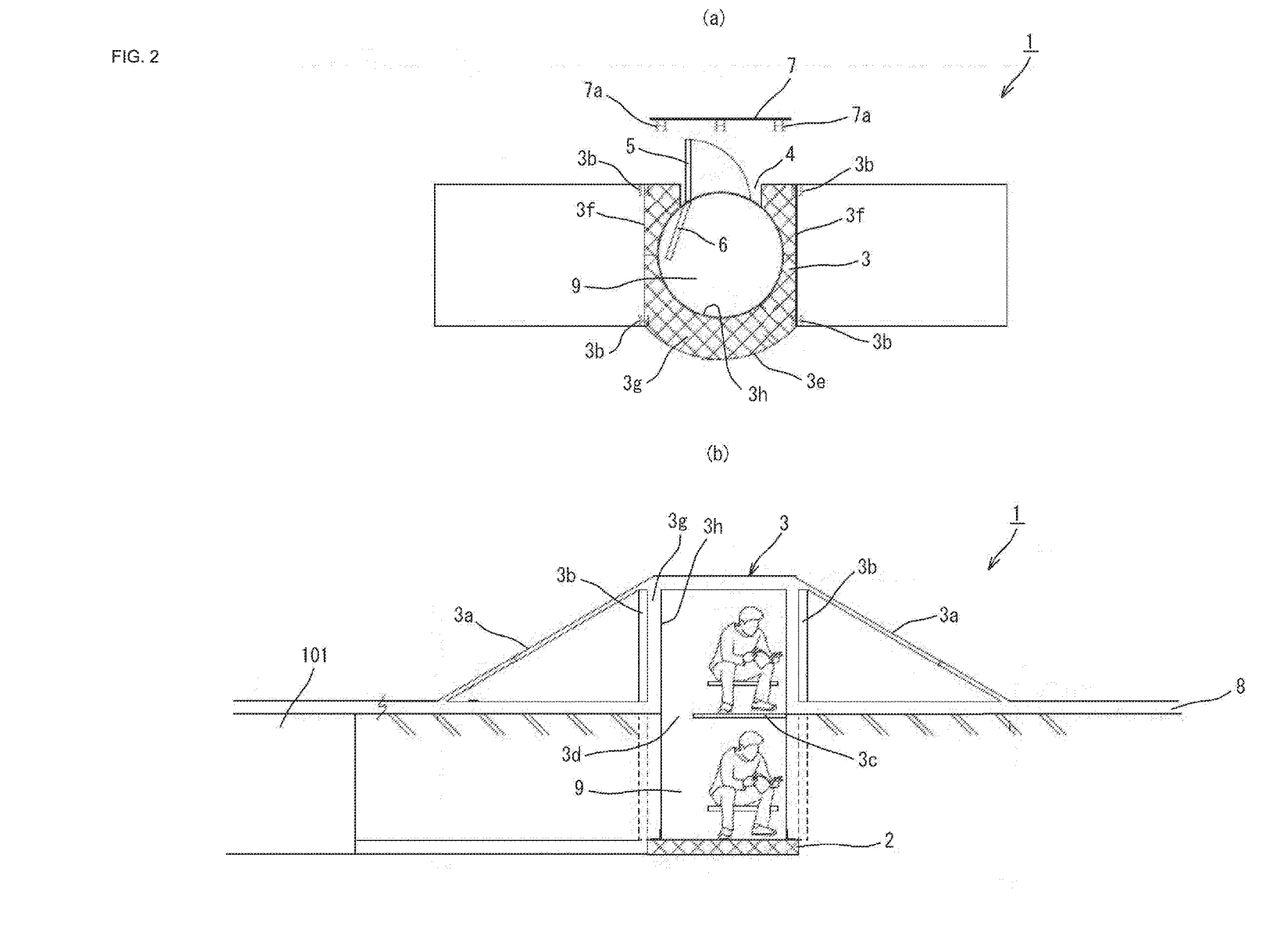
Figure 3:
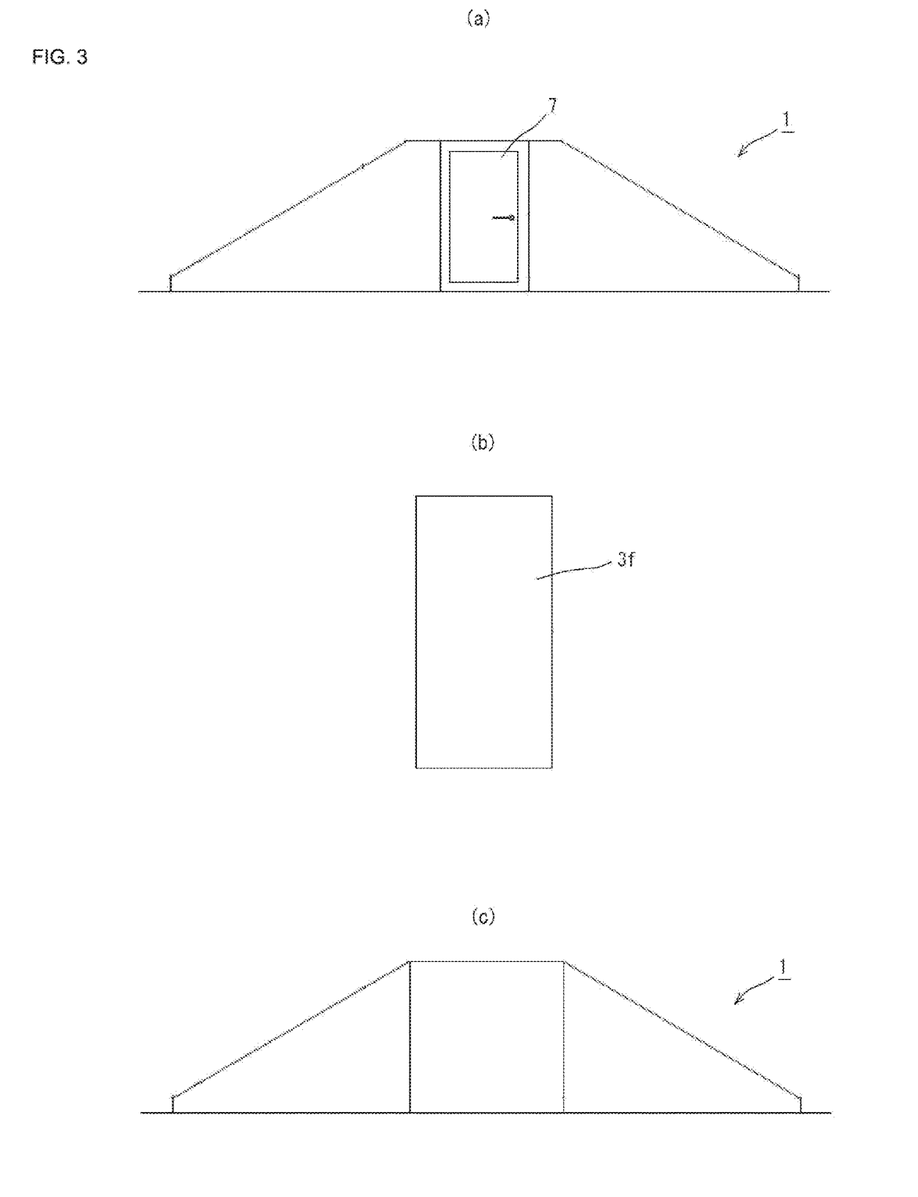

Preferred embodiments of the present invention will be described with reference to FIGS. 1 to 3. A half-underground evacuation shelter 1 according to an embodiment of the present invention is provided with a shelter main body 3 fixedly attached to a concrete foundation 2. The rebars of the concrete surrounding the half-underground evacuation shelter 1, the rebars of the concrete foundation 2, and the rebars of the solid foundation 101 of the house 100 are connected. This prevents the subsidence caused by the liquefaction phenomenon at seismic intensity 7 of the assumed Nankai Trough Great Earthquake. For illustration, the land area is 40 tsubo (132 m$^2$), first floor area is 15 tsubo (50 m$^2$), second floor area is 15 tsubo (50 m$^2$), and the total floor area is 30 tsubo (99 m$^2$). The thickness of the concrete foundation 2 is 150 mm. In addition to the house 100, a parking lot 200 is provided in the premises for automobiles 201. In addition, a half-underground evacuation shelter 1 is provided in the garden 300, and a fence 400 is appropriately provided around it.

The shelter main body 3 is a structure made of reinforced concrete, and slopes 3a are provided on both outsides of the shelter main body 3. The slope 3a is provided with surplus soil and the surface is covered with concrete. The shelter main body 3 is reinforced with a plurality of H-section steel members 3b. An opening 4 is provided in the above-ground portion, and an outer door 5 and an inner door 6, which constitute a fireproof steel door of a double structure for opening and closing the opening 4, are provided so as to withstand the pressure of a tsunami. A protective wall 7, with H-section steel members 7a connected to the back surface thereof, is detachably provided at the opening 4. The floor reinforced concrete 8 is provided on the surface of the earth, and the thickness is exemplified as 150 mm. The internal space 9 has a columnar structure. The internal space 9 has a cylindrical structure, and is partitioned by a floor plate 3c thereby having a two-floor structure. An opening 3d is provided so as to enable people to pass through. Two pairs of the H-section steel members 3b are provided on the walls (in contact with the slopes 3a) of both sides of the reinforced concrete shelter main body 3 in the vertical direction. Two iron plates 3f (see FIG. 3 (b)) are inserted into the grooves of the H-section steel members 3b and fixed. The protective wall 7 is an iron plate. The H-section steel members 7a are fixed on the back surface of the protective wall 7, and the outer surface of the protective wall 7 is finished with waterproof coating. A protruding portion 3e in an arc shape protrudes toward the back side of the half-underground evacuation shelter 1.

The shelter main body 3 has a double structure wherein the outer region is a reinforced concrete 3g and the inner region is a cylindrical structure of an iron plate 3h.

For example, the thickness of the protective wall 7 and the iron plate 3f is 9 mm, and the thickness of the outer door 5 and the inner door 6 is 75 mm. The length of the half-underground evacuation shelter 1 is 6430 mm (the length of the shelter main body 3 is 1550 mm, the length of the slope 3a is 2515 mm), the height above the ground is 1550 mm, the lateral width is 1600 mm, the projecting length of the projecting portion 3e is 360 mm, and 700 mm. The thickness of the reinforced concrete of the wall of the shelter main body 3 and the thickness of the floor reinforced concrete 8 are 150 mm, the angle of the slope 3a is 30 degrees, the inner diameter of the internal space 9 is 1400 mm, the height is 2800 mm (1 F height is 1400 mm, the height under the ground is 1370 mm, the thickness of the floor plate 3c is 30 mm). It can accommodate up to four adults in the interior space 9. Expansion or extension are possible when increasing the number of people.

The outer door 5 and the inner door 6, which constitute a fireproof steel door, have a strength with water-tightness and impact resistance performance. Sand is sealed inside for fire protection.

Figure 4:
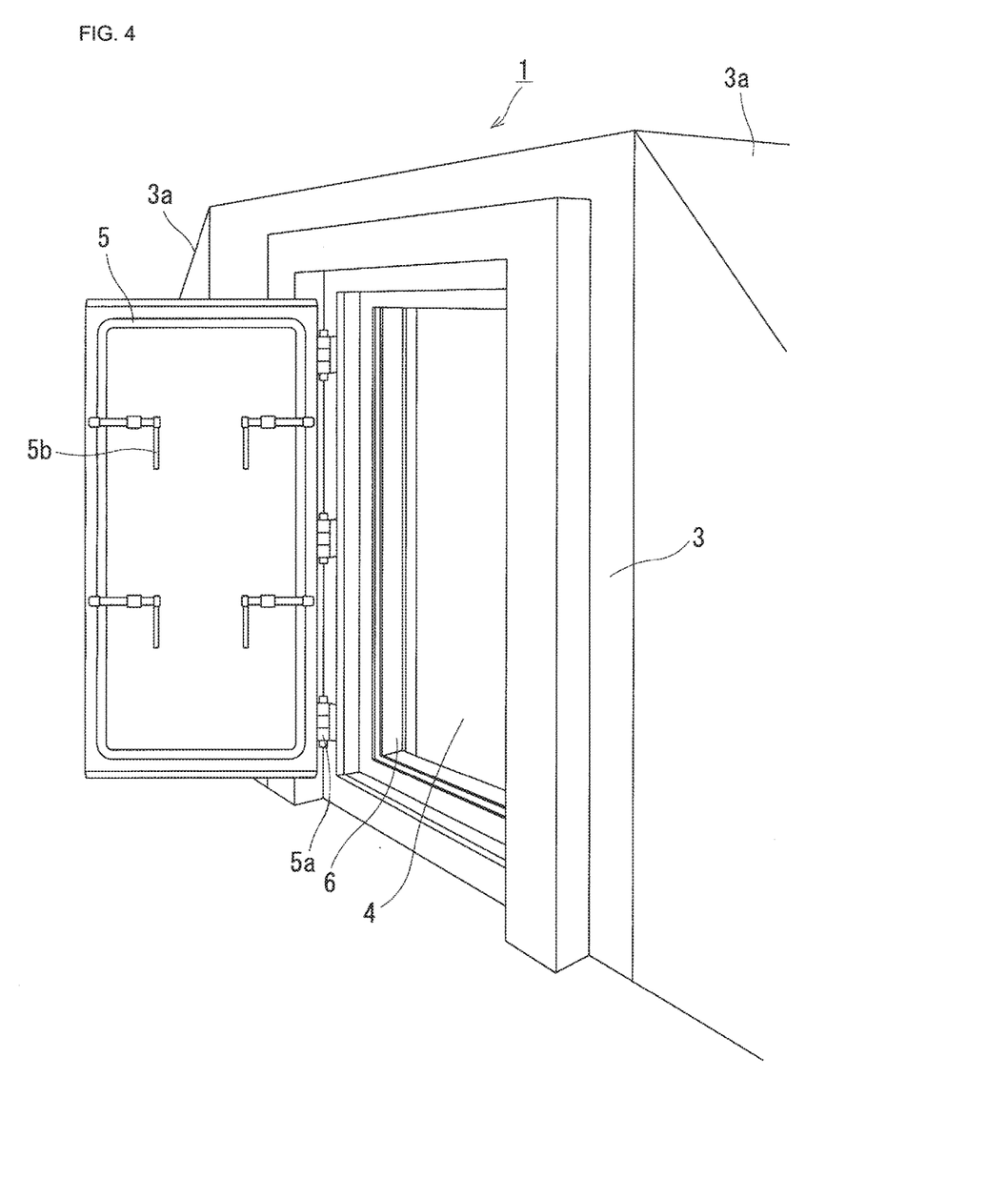
FIG. 4 shows a perspective view from the outside in a state where the steel door of the half-underground evacuation shelter 1 is open.
Figure 5:
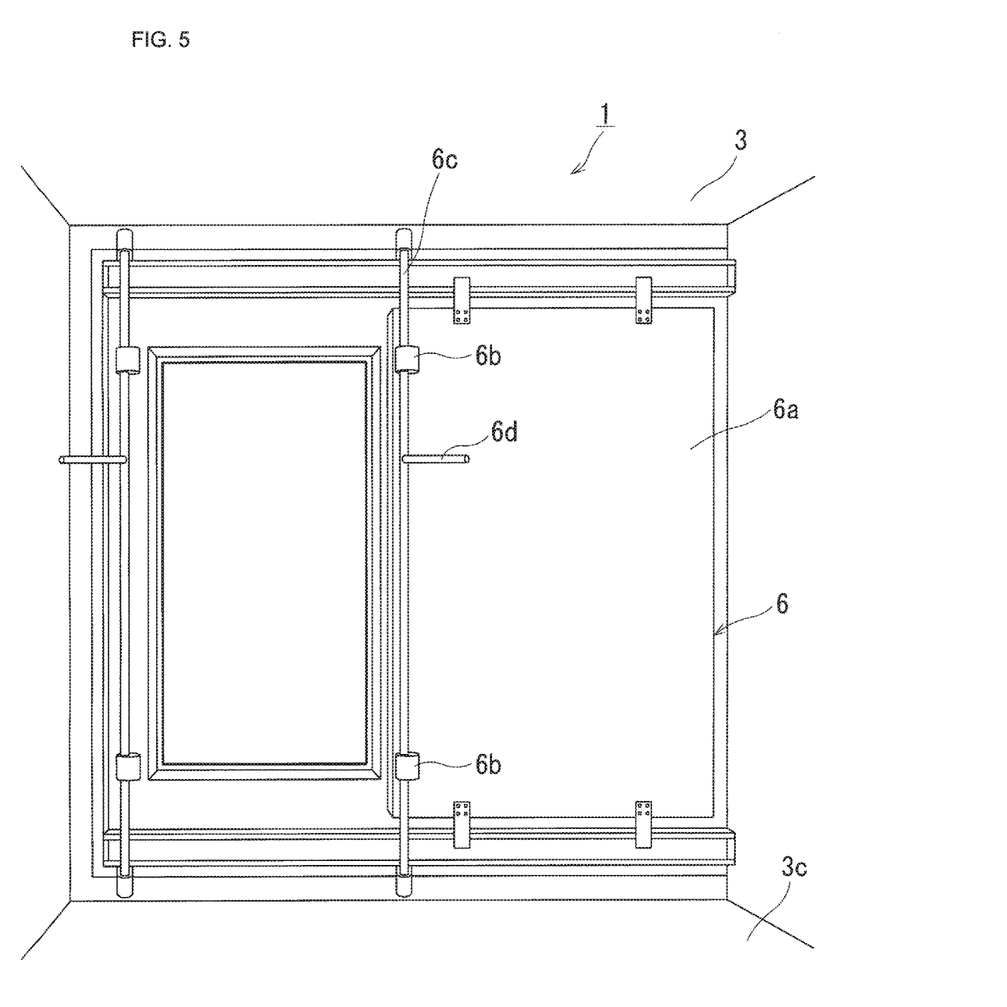
FIG. 5 shows a perspective view from the inside in a state in which the steel door of another embodiment of the half-underground evacuation shelter 1 is opened.

An example of the opening 4, the outer door 5 and the inner door 6, etc. are illustrated in FIGS. 4 to 5. The outer door 5 is not provided on the ceiling. It is because it is heavy, and it is difficult for people to lift it. It is to prevent injuries.

The inner door 6 has a structure similar to that of the outer door 5, and is a door type structure opening and closing inward.

Instead of this, the inner door 6 may be replaced with a door of a sliding structure. FIG. 5 shows another modification, wherein the outer door 5 is a door structured to be opened and closed outward by hinges 5a (here, two-axis hinges) and locked by locks 5b. The inner door 6 is a sliding type structure of an eccentric rotational locking type wherein a slide plate 6a slides to the left and right and a shaft 6c having cams 6b is rotated by a handle 6d to lock the slide plate 6a.

The half-underground evacuation shelter 1 is designed such that the outer door 5 and the inner door 6 can withstand a water pressure of 200 kN/m$^2$ at a water depth of 20 meters and withstand typhoons and tornadoes. The outer door 5 and the inner door 6 make a double door structure so as to withstand the impact of colliding objects caused by a tsunami. Impact resistance performance is improved by installing a propped rod from the inside.

Figure 6:
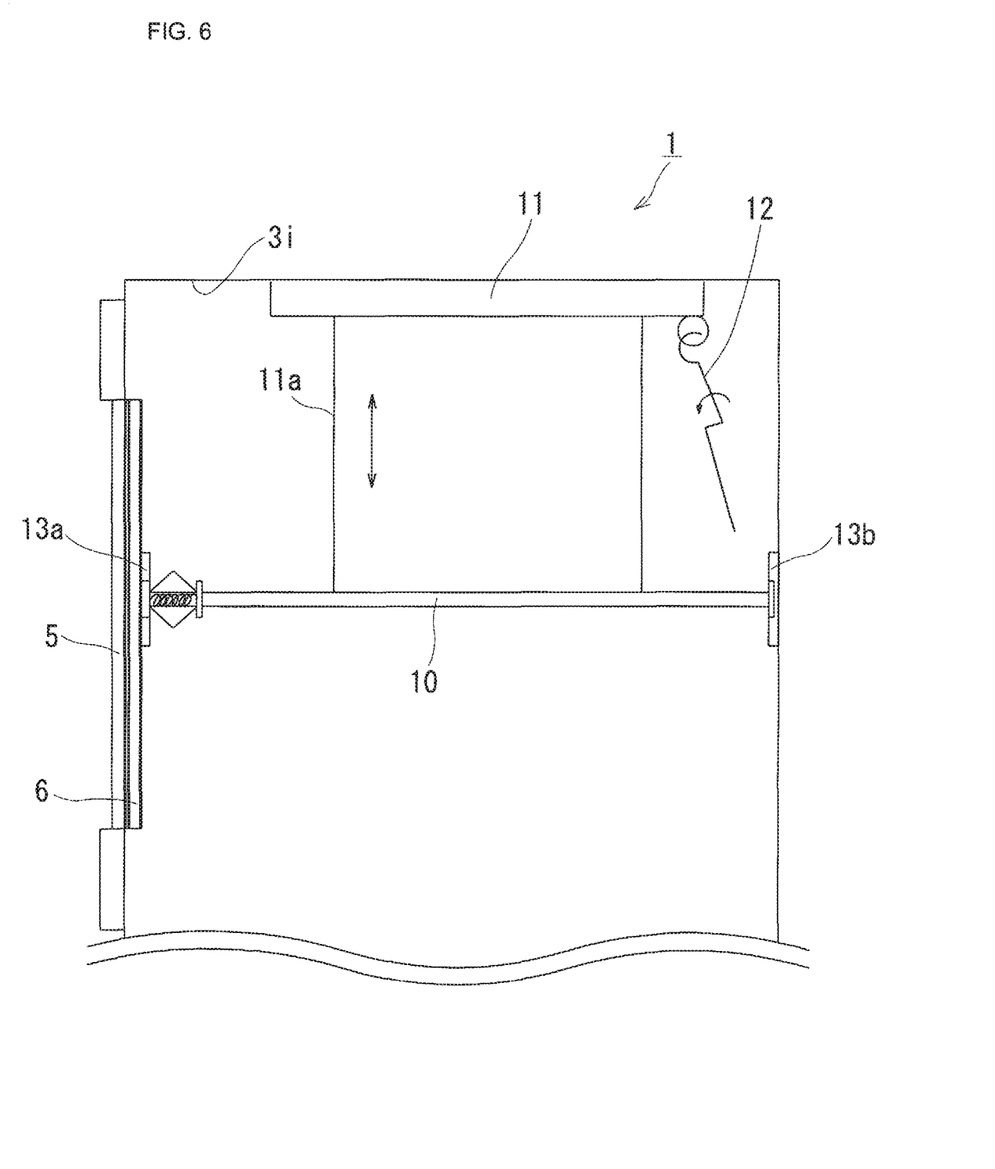
FIG. 6 shows a vertical longitudinal sectional view showing a jack 10, a suspending tool 11, and receiving metal brackets 13a and 13b of the half-underground evacuation shelter 1.
Figure 7:
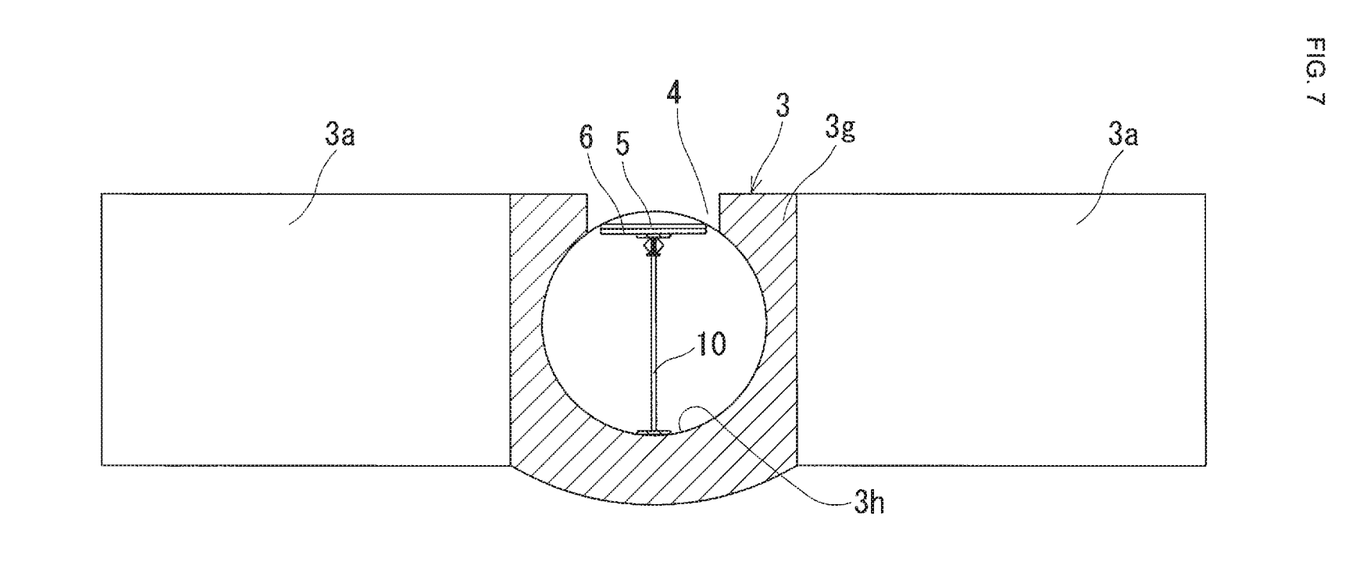
FIG. 7 shows a plan view of the half-underground evacuation shelter 1.
Figure 8:
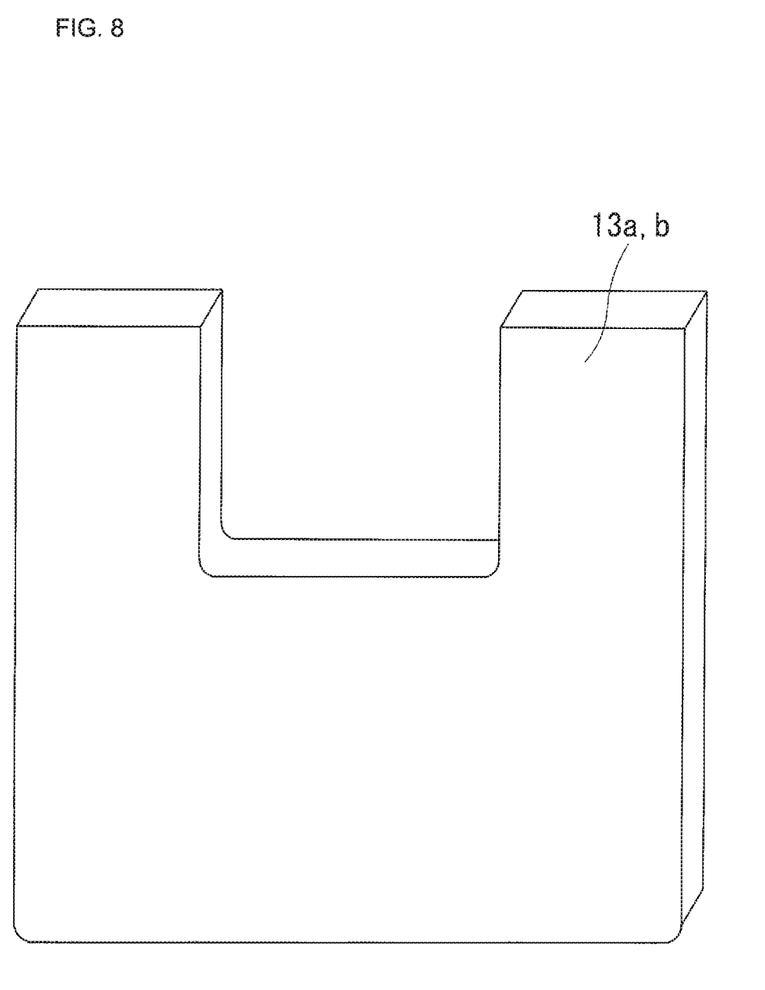
FIG. 8 shows a perspective view of a receiving metal bracket of the half-underground evacuation shelter 1.

As shown in FIGS. 6 to 8, a jack 10 is provided on the ceiling surface 3i and suspended by a suspending part 11 having a wire 11a. The wire 11a and a rotating tool 12 interlock with each other. The jack 10 can be raised or lowered by rotating the handle-type rotating tool 12 clockwise or counterclockwise. Although the jack 10 is normally arranged near the ceiling surface 3i, it can descend to a predetermined height, and both end portions of the jack 10 are fitted to the receiving metal brackets 13a, 13b. The receiving metal bracket 13a is provided on the inner wall surface of the outer door, and the receiving metal bracket 13b is provided on the opposing wall surface. The receiving metal brackets 13a and 13b are provided with concave grooves for receiving and supporting the respective end portions of the jack 10. When the half-underground evacuation shelter 1 is buried with debris, the jack 10 is lowered to the receiving metal brackets 13a, 13b by rotating the rotating tool 12, and the outer door 5 of a fireproof steel door can be opened by the jack 10.

Figure 9:
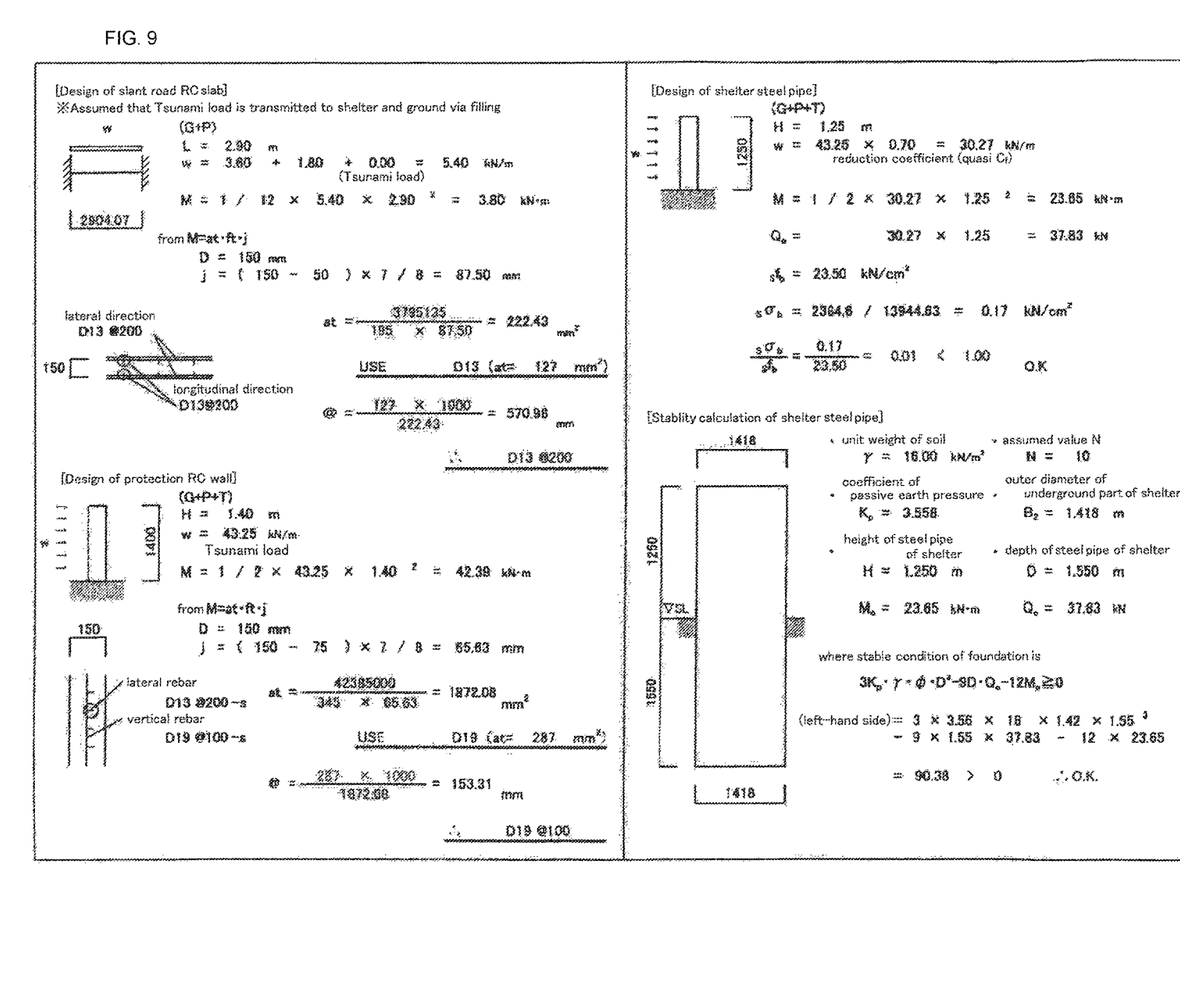
FIG. 9 shows a chart of a design of a slant road RC slab and a shelter steel pipe, and a stability calculation, for the half-underground evacuation shelter 1 according to the embodiment of the present invention.
Figure 11:
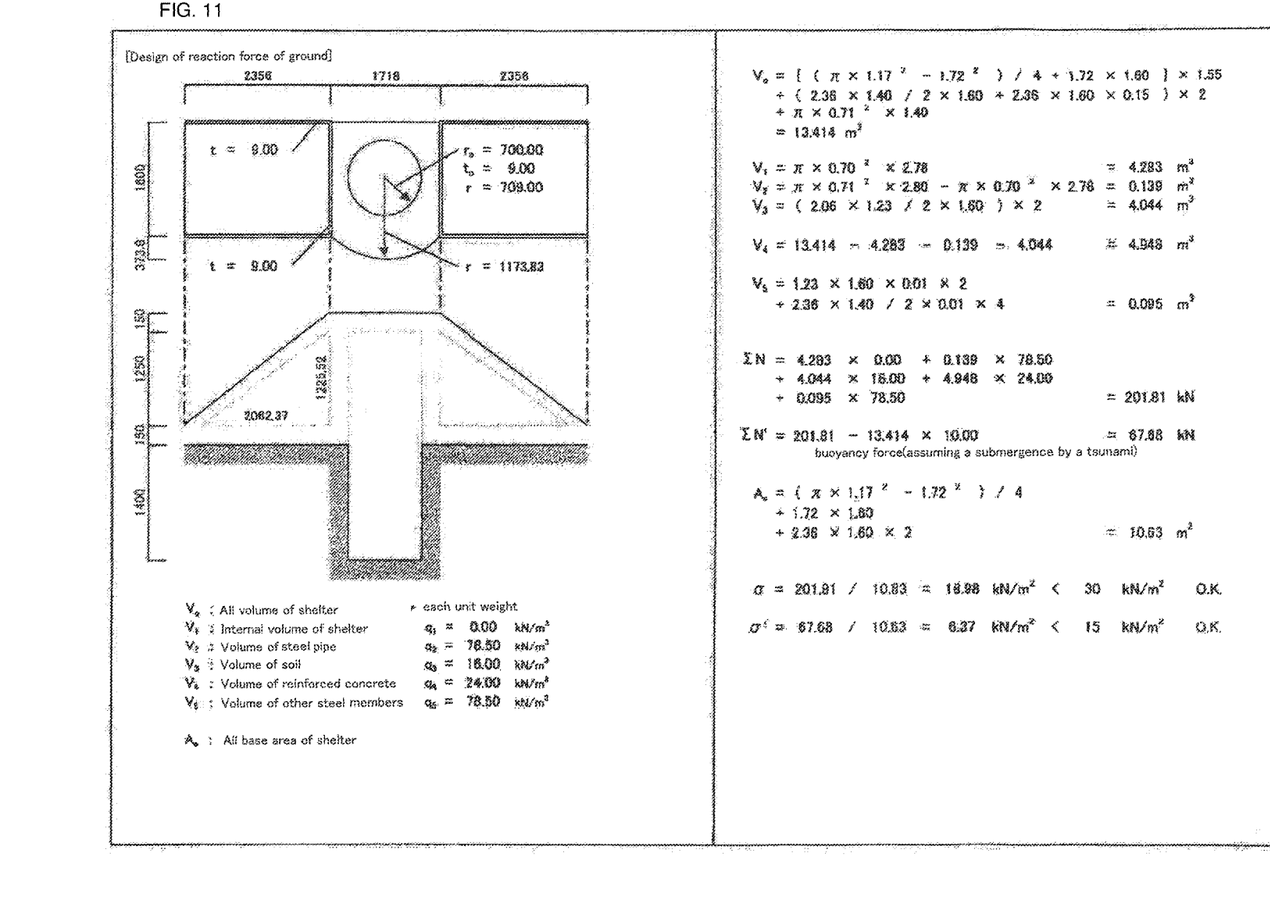
FIG. 11 shows a chart of a design of a ground reaction force of the half-underground evacuation shelter 1 according to the embodiment of the present invention.

Design examples of the half-underground evacuation shelter 1 are shown in FIGS. 9 to 11. For designing the structure of the shelter main body, the calculations is performed based on the conditions that the shelter main body 3 is subjected to a vertical load and a tsunami load. The calculation of the foundation is performed based on the condition that the shelter main body 3 is installed to the foundation and is subject to a vertical load. Based on the calculation at the time of tsunami loading, concrete casting around the main body and connection with the peripheral foundation is performed. In addition, the tsunami wave pressure formula was calculated according to the new guidelines such as the Tsunami Disaster Prevention Community Renovation Law announcement etc. The calculation of the foundation was performed according to the calculation formula used for the underground embedded foundations of road signs.

It is preferable to set the building area within 10 m$^2$ (for example, 9 m$^2$) where building confirmation application is unnecessary. The size of the shelter main body 3 is calculated assuming the necessary space as 1.5 m$^3$ per person. It is supposed to accommodate 4 people for general families. 4 people×1.5 m$^3$=6.0 m$^3$. It is possible to change the size of the shelter main body according to the conditions such as the existing building and number of people to be accommodated.

Although the shelter is embedded outside the building in the above embodiment, it is also applicable to the case of being installed inside the building.

The planar installation position of the shelter main body 3 is selected from places that are easy to jump in immediately when evacuating such as places next to a front door, a front yard, etc. When the site is wide, it is bonded to an existing concrete structure other than the foundation of the building. The reason is to increase resistance against the moment of a tsunami.

An oxygen cylinder is prepared in the shelter main body 3. By blowing out oxygen, the interior pressure rises.

As the content of oxygen in the shelter is not enough for oxygen aspiration, oxygen is supplied from the oxygen cylinder which is installed in advance. Capacity of the oxygen cylinder is designed to be enough for living inside the shelter depending on the conditions such as the number of people to be accommodated, children or adults and so on.

In order to ensure adequate oxygen concentration, the concentrations of oxygen and carbon dioxide necessary for maintaining safe and secure living comfort within the half-underground evacuation shelter 1 can be detected by the concentration meter in the room. When the concentration deviates from an appropriate reference value, it is possible to adjust the oxygen concentration by injecting the installed oxygen can. Likewise, the concentration adjustment of carbon dioxide is possible. Target value of the oxygen concentration inside the shelter is 19%. Examples of necessary devices include an oxygen supply device set, an atmospheric pressure adjustment device, a carbon dioxide reduction device set, and the like.

A pressure reduction valve that decreases the pressure of the gas inside the shelter main body 3 is installed. Parts of water supply are also provided. In order to prevent excessive increase of carbon dioxide, carbon dioxide is adsorbed by slaked lime water solution or zeolite to reduce carbon dioxide. Since the storage battery is fully charged by the photovoltaic power generation panel, the storage battery continues to drive the slaked lime pump.

There are multiple (in this example, two) monitors to see the outside. As the monitors does not work in the middle of the night due to darkness, a thermometer can be set outside to monitor the outside. Outside air temperature, inside air temperature, oxygen gauge, etc. ppm and carbon dioxide concentration can be recorded every predetermined time (for example, 30 minutes). In the case of midwinter, the temperature of the outside air thermometer rises as the tsunami intrudes, the judgement can be done whether or not the tsunami came even in the middle of the night.

The shelter main body 3 has a communication function such as a mobile phone, a satellite phone, a transceiver, etc, simple toilet, AED, and disaster prevention goods etc.

Next, the construction method is explained. Basically, it is assumed that the removal of the floor and the foundation has been completed in the construction work. When installing the main body, a hole having a size larger than the external dimensions of the main body of the half-underground evacuation shelter 1 both in the vertical and horizontal directions is dug on the ground. The depth is not constant due to a relation between the concrete foundation 2 and the earth pressure, but excavation is carried out based on the above calculation formula. Depending on the case of preliminary survey, it may be necessary to carry out earth retaining work. When an earth retaining work is necessary, it should be carried out simultaneously.

Ground is dug to a prescribed depth using human power and ultra small excavator. The dig work should be carried out paying attention to the behavior of the main body of the building. Especially careful attention is required to the depth of dig. After the dig is completed, pressure is applied by the engine type plate, and then the crushed stone is layered. As the material of the crushed stone, recycled aggregate of JIS standard RC 25 is used. After flattening the crushed stone, the engine plate performs surface compaction for flattening.

Subsequently, the concrete foundation 2 is constructed. After connecting the rebars of the concrete foundation 2 with the solid foundation 101 of the house 100 with rebars, concrete is cast. Concrete material is ordinary Portland cement. If shortening of construction schedule is necessary, rapid strength concrete shorten curing time. Basically it is on-site construction. Surface protecting concrete is placed on the concrete foundation 2. Concrete material may be ordinary Portland cement.

The concrete foundation 2 is preferably reinforced by placing a winged steel pipe pile like a screw pile in the earth. This not only supports the half-underground shelter 1 but also prevents it from collapsing.

The shelter main body 3 is constructed after concrete is hardened. In the case of on-site construction, concrete is cast after constructing rebars. The shelter main body 3 has a double structure with a reinforced concrete 3g in the outer region and an iron plate 3h of a cylindrical structure in the inner region. The iron plate 3f is welded so as to resist water pressure. Two pairs of H-section steel members 3b are connected to the rebars on the sides adjacent to the slopes 3a of the shelter main body 3 with a space between them, and then concrete is cast and half of each H-section steel member 3b is thus embedded and fixed. Iron plates 3f are inserted and fixed in grooves formed by pairs of H-section steel members 3b.

The shelter main body 3 is constructed by on-site construction, but it may be precast concrete manufactured at factory. Since this part is heavy, it is carried in with a truck crane. The shelter main body 3 is installed in accordance with the entrance anchor which is buried in the foundation concrete 2 in advance. After installation, it is fixed with nuts. The nuts are uniformly fastened by a torque type wrench.

Next, a combination of the surplus soil and cement is piled on both sides of the shelter main body 3 and concrete is placed on the surface so that the slopes 3a are constructed.

Next, an outer door 5 of a fireproof steel door is attached to the opening 4. An inner door 6 is put in advance in the internal space 9, and it is installed later.

The effect of this embodiment is hereinafter described.

The half-underground evacuation shelter 1 stay in the place where people evacuate to and can withstand secondary disasters such as tsunami, fire, and debris flow, as well as earthquake. Elderly and disabled people can safely evacuate. Innovative and more reliable performance highly necessary in modern society is offered.

It is possible to provide a safe shelter with a reduced construction cost and a shortened construction period. In addition, it can be made compact and the construction area of the shelter can be made small. It is possible to omit the application for confirmation to the city government and to reduce the time and labor for building. Furthermore, people can go in and out via above-ground part by opening the outer door 5 and the inner door 6 which are doors made of fireproof steel. The size of the opening 4 can be increased by increasing the budget. As a barrier-free structure, the disabled people can evacuate by covering the floor with a board.

The shelter can be constructed as a set connected with the housing foundation and the exterior part so that the cost can be reduced. For example, it is possible to reduce the cost so that people in income groups with an annual income of 3 million to 4 million yen can afford a safe house with a shelter at a price comparable to that of a rental house. Further, for example, it is possible to reduce the cost to such an extent that the construction cost is less than 3 million yen. The cost can be further cut down by using subsidies. By adopting a structure integrated with the foundation 101 of the house 100, it is possible to aim for dissemination by reducing the cost as compared to the cost for constructing a shelter alone. For example, it is possible to sell a house of a total floor space of 33 tsubo (109 m$^2$), with an evacuation shelter in the garden attached thereto, at the 16 million yen level. This is equivalent to the selling price of the residential part of the average spec houses. Housing with added value of an evacuation shelter is expected to be monetized. Above all, it also contributes to the national mission and role of protecting as many lives as possible. In addition, considering land information as one of the commercial items for these people, a set of a house, land information and a shelter is vendible.

By making the shelter main body 3 compact, it is possible to reduce the construction area of the shelter. It is thus possible to omit application for confirmation to the city government and to reduce time and labor for building.

The half-underground evacuation shelter 1 is adjacent to the house 100 such as their own home so that people can go in and out from the above-ground in an emergency to evacuate immediately. Even in an emergency, people can evacuate within 1 minute to 3 minutes. Even elderly people, disabled people and infants can evacuate within 3 minutes from the occurrence of an earthquake warning. Even if the shelter is submerged by tsunami, oxygen and other things necessary for life support can be maintained for at least 3 days. It is thus possible to provide an environment to live safely and securely.

In particular, it is possible to provide a safe and secure housing without tsunami concern for people who reside or live in the future in coastal areas.

Water pressure resistance performance is 2 atm (corresponding to water depth of 20 m) and an air conditioning function such as oxygen is provided assuming when the shelter is submerged. For example, food and water sufficient for four adults to live in the shelter for at least 3 days can be stored.

If the shelter 1 is buried with debris, the jack 10 put in the internal space 9 can open the outer door 5 which is a fireproof steel door.

If the shelter main body is precast concrete, the work of making and removing a temporary frame and disposal cost can be omitted.

INDUSTRIAL APPLICABILITY

Evacuation shelters for household use can be provided at a low cost with a shortened construction period, and it is possible to provide a safe and secure environment against tsunami, fire, tornado, and the like. Especially in coastal areas, its industrial utility value is great.

REFERENCE SIGNS LIST

1: a half-underground evacuation shelter
2: a concrete foundation
3: a shelter main body
3a: a slope
3b: H-section steel member
3c: a floor plate
3d: an opening
3e: a protruding portion
3f: an iron plate
3g: a reinforced concrete
3h: an iron plate
3i: a ceiling surface
4: an opening
5: an outer door
6: an inner door
5a: a hinge
5b: a lock
6a: a slide plate
6b: a cam
6c: a shaft
6d: a handle
7: a protective wall
7a: a H-section steel member
8: a floor reinforced concrete
9: an internal space
10: a jack
11: a suspending part
11a: a wire
12: a rotating tool
13a, 13b: receiving metal brackets
100: a house
101: a solid foundation
200: a parking lot
201: an automobile
300: a garden
400: a fence

The invention claimed is:

1. A half-underground evacuation shelter comprising:
a shelter main body fixed to a concrete foundation,
wherein said shelter main body has a double structure having an outside structure of reinforced concrete and an inside cylindrical structure of an iron plate;
a slope is provided outside said shelter main body;
said shelter main body is a reinforced concrete structure with an internal space having said inside cylindrical structure;
a fireproof steel door having a double structure is provided on an above-ground part of said shelter main body;
said shelter main body is structured to withstand a pressure of tsunami;
said concrete foundation is connected to a concrete foundation of a house; and
a jack suspended from a ceiling surface of said shelter main body so as to be able to move up and down in said internal space, a rotating tool for raising and lowering said jack, and a receiving metal bracket for receiving said jack when said jack is lowered.

2. The half-underground evacuation shelter according to claim 1, wherein said internal space is divided into two layers by a floor.

3. The half-underground evacuation shelter according to claim 1, wherein said shelter is capable of withstanding water pressure of 20 m of water depth and has a residential environment set to allow survival for at least 3 days in a sealed state.

4. The half-underground evacuation shelter according to claim 1, wherein said fireproof steel door has a structure opened and closed by a hinge, said fireproof steel door comprises an outer door and an inner door, and said outer door is opened and closed outward, and said inner door is opened and closed inward.

* * * * *